Nov. 18, 1952 L. R. BOURGET 2,618,711

PHASE INVERTER AMPLIFIER

Filed Jan. 10, 1949

INVENTOR.
Louis R. Bourget
BY Flehr & Swain
ATTORNEYS

Patented Nov. 18, 1952

2,618,711

UNITED STATES PATENT OFFICE 2,618,711

PHASE INVERTER AMPLIFIER

Louis R. Bourget, Sacramento, Calif.

Application January 10, 1949, Serial No. 70,092

2 Claims. (Cl. 179—171)

This invention relates generally to electronic amplifiers of the phase inverter type, such as are capable of supplying push-pull voltages in response to unbalanced voltages applied to its input.

Electronic amplifiers of the phase inverter type have been known and used in the past, and have theoretical advantages. However they have been subject to certain practical limitations and disadvantages due to their inherent electrical characteristics. For example it has been difficult to maintain an accurate balance between the two sides of the inverter. In some instances the apparatus can be adjusted for perfect balance over a limited range of frequencies, but when it is attempted to operate over a broader range, into the higher audio and/or video frequencies, unbalance occurs with resulting distortion. In addition many of such prior converters have been highly critical with respect to the values of certain of the electrical elements of the circuit.

It is an object of the present invention to provide a phase inverter type of amplifier which is capable of operating in perfect balance over a relatively wide range of frequencies.

Another object of the invention is to provide an amplifier of the above type which can be used to advantage over a wide range of audio and video frequencies, and which will provide a substantial amplification gain with negligible distortion.

Additional objects and features of the present invention will appear from the following description in which the preferred embodiments has been set forth in detail in conjunction with the accompanying drawing.

Referring to the drawing.

Figure 1:
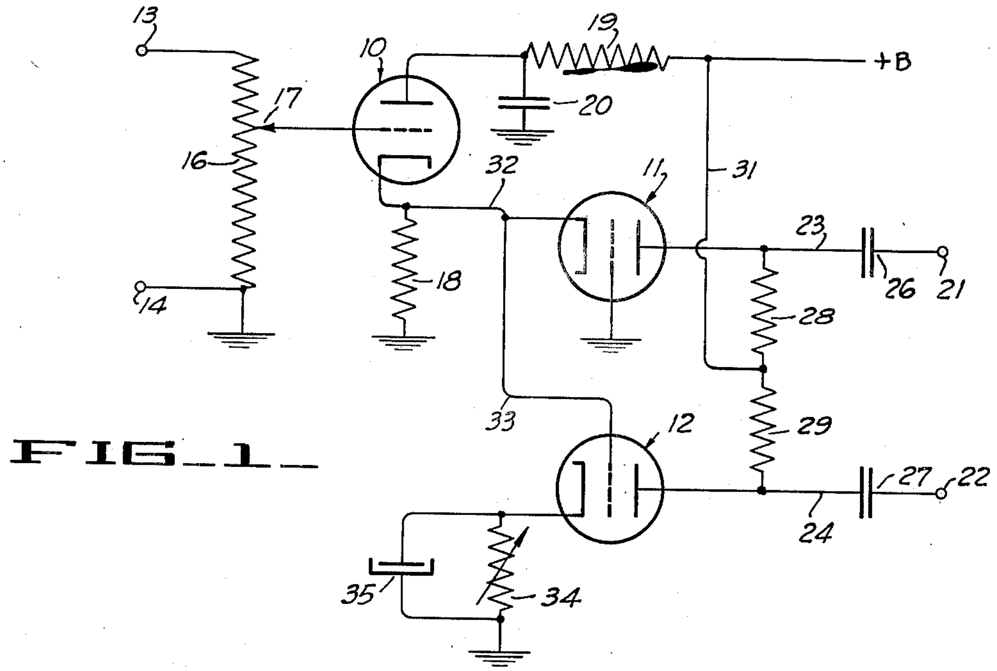
Figure 1 is a circuit diagram illustrating one form of the invention.

As illustrated in Figure 1, the amplifier employs vacuum tubes 10, 11 and 12, each of which includes grid, plate and cathode elements. The grid of the tube 10 is coupled to an input circuit represented in this instance by the terminals 13 and 14. To facilitate volume or gain control, a potentiometer type of resistor 16 is connected across terminals 13 and 14, and the adjustable tab 17 on this resistor is directly connected to the grid of tube 10. As will be presently explained tube 10 is arranged to operate as a cathode follower, and its cathode is connected to ground through the resistor 18. The plate of tube 10 is connected to the positive side of a source of plate voltage, through the resistor 19, which is by-passed or decoupled by capacitor 20.

The plates of the tubes 11 and 12 are coupled to an output or load, represented in this instance by the output terminals 21 and 22. Conductors 23 and 24 serve to connect the plates of tubes 11 and 12 to the terminals 21 and 22, in series with the blocking condensers 26 and 27. Both plates of these tubes are connected to the source of plate current by the resistors 28 and 29 and the conductor 31.

The cathodes of the tubes 10 and 11 are directly connected by the conductor 32. Conductor 33 connects the grid of the tube 12 to the cathodes of tubes 10 and 11. The grid of the tube 11 is directly grounded as illustrated.

The cathode of the tube 12 is shown connected to ground through the resistor 34, which in this instance is shunted by the condenser 35.

The tubes 10, 11 and 12 are selected to have suitable electrical characteristics for use in my circuit. It is desirable to use vacuum tubes of relatively high mutual conductance, and good results are secured by using triodes or pentodes. In practice I have used a triode known by manufacturers' specifications as No. 6J5, for the tube 10, and No. 6SN7, for the tubes 11 and 12. Tube 6SN7 consists of two tubes in a single evacuated bulb, each of the two tubes corresponding to a single No. 6J5. The mutual conductance of these tubes is not as high as others which are available, but they were selected because they will operate with relatively little distortion. The other electrical elements of the circuit may have values such as will be presently specified by way of example.

Operation of the circuit described above is as follows: Assuming that unbalanced alternating current voltage is applied to the input terminals 13 and 14, as for example from a preceding unbalanced amplifier stage, voltages are applied to the grid of tube 10, depending upon the setting of the tap 17. Tube 10 operates as a cathode follower, and voltages are developed across the resistor 18 directly proportional to the applied input voltages. Because the cathode of tube 11 and the grid of tube 12 are directly connected to the cathode of tube 10, alternating current voltage developed across the resistor 18 directly drives the grid of tube 12 and the cathode of tube 11 simultaneously. Therefore the alternating current output voltages developed across the output resistors 28 and 29 are 180° out of phase. By the selection of a proper value for the resistor 34, the tubes 11 and 12 can be made to operate exactly in balance. Assuming that the tubes are reasonably matched perfect balance usually occurs when the value of resistor 34 is such that the plate to cathode current flow for each of the two tubes 11 and 12 is equal. Although resistor 34 is indicated as being adjustable, it will be evident that when the proper value of this resistor is known for a particular circuit, one may employ a resistor of fixed value. It has been found advantageous to employ a variable resistor 34 so that if a tube replacement becomes necessary the resistor may be readjusted for perfect balance. It is desirable to operate all of the three tubes 10, 11 and 12, in class A, insofar as the bias voltage is concerned. This serves to hold distortion to a minimum value.

By way of example, I have constructed an audio frequency amplifier using the tubes specified above, and having values of resistors and condensers as follows: Resistor 18, 1,000 ohms; resistor 19, 50,000 ohms; resistors 28 and 29 each 50,000 ohms; resistor 34, 10,000 ohms adjusted to 3,000 ohms to obtain correct balance; condenser 35, 50. microfarads; capacitor 20, 8. microfarads; and condensers 26 and 27 each 0.1 microfarad. The plate supply was 350 volts. This circuit remained in perfect and stable balance, as was verified by a measurement of the plate to cathode current flow of each of the tubes 11 and 12, and this balance was maintained over a range of frequencies from 20 to 150,000 C. P. S. A 3 to 4 decibel taper was noted at a frequency of 20,000 C. P. S. Checks were also made with a Hewlett-Packard No. 200C audio oscillator and measured with a Dumont No. 208B oscilloscope. The results indicated above were verified.

Figure 2:
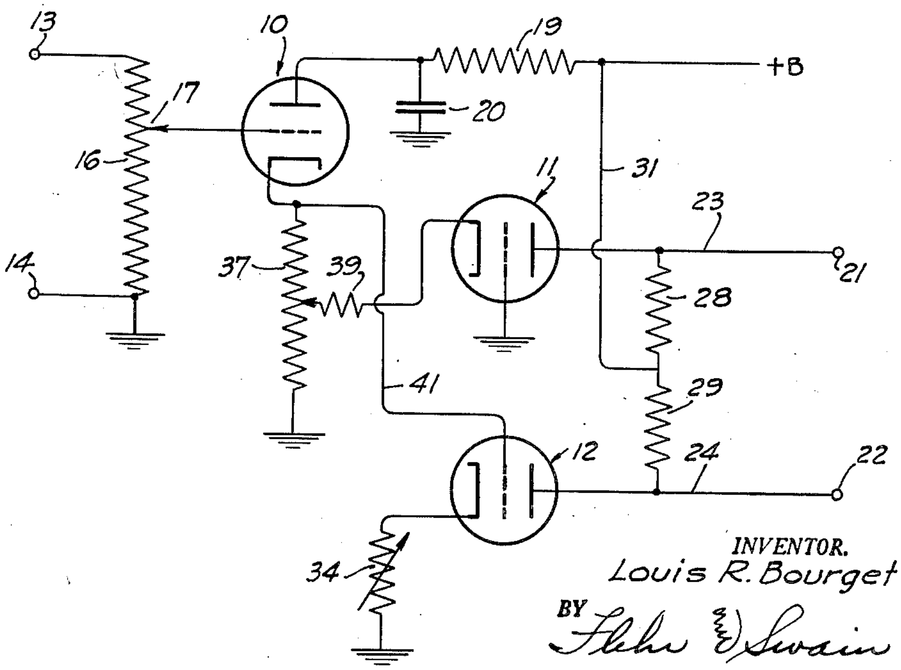
Figure 2 is another circuit diagram illustrating a modification of the invention.

Figure 2 illustrates a modification of my circuit which is well adapted for application of frequencies ranging from D. C. to more than 100,000 C. P. S. In this instance the potentiometer resistor 37 connects the cathode of tube 10 to ground. The cathode of tube 11 is connected to the contactor arm of potentiometer 37 through the resistor 39. Conductor 41 directly connects the cathode of tube 10 with the grid of tube 12. Resistor 34 likewise in this instance serves to connect the cathode of tube 12 to ground, but is not shunted by a condenser corresponding to the condenser 35 of Figure 1.

In the circuit of Figure 2 inverse feedback voltage is developed across the cathode resistor 34, and tends to cause less amplification in tube 12 than in tube 11. However this is compensated for by adjustment of the contactor arm of potentiometer 37, whereby for a given applied input voltage, the corresponding voltage applied to tube 12 is somewhat greater than the voltage applied to the cathode of tube 11.

With the circuit of Figure 2 the value of resistor 34 is again selected to provide for equal plate to cathode current flow through the tubes 11 and 12. The tap or contactor arm of the potentiometer 37 may be adjusted a small amount if necessary to assist in establishing perfect balance. When so adjusted the circuit maintains perfect stable balance over the frequency range indicated above.

By way of example, the various resistors for the circuit of Figure 2 can be as follows: Potentiometer 37, 1,000 ohms; resistor 39, 500 ohms; resistor 19, 50,000 ohms; resistors 28 and 29 each 50,000 ohms; resistor 34, 10,000 ohms adjusted to 3,000 ohms and capacitor 20, 8. microfarads.

Because all of the essential electrical elements of the circuit of Figure 2 are resistors, this circuit may be said to be completely direct current coupled, and is therefore suitable for the purpose of feeding a completely direct current coupled amplifier, where the input circuit of such an amplifier requires push-pull voltages to be applied to the same.

When my circuit is applied to amplifiers which are to operate over a relatively wide band of frequencies, such as video or pulse amplifiers, it may be desirable to use lower values of resistance for resistors 28 and 29. However in many instances such lower values may not be required because of the low impedance cathode follower driver output from tube 10, which minimizes high frequency losses due to the Miller effect and stray capacitances.

I claim:

1. In an electronic apparatus for phase inversion and amplification, a first vacuum tube having control grid, plate and cathode elements, an input circuit coupled to the control grid of said tube, a source of plate current connected to the plate, a resistor connected between the cathode and ground, second and third vacuum tubes each having control grid, plate and cathode elements, means serving to conductively connect the cathode of the second tube and grid of the third tube to the cathode of the first tube whereby the cathode of the second tube is connected to ground through said first named resistor, a separate resistor connected between the cathode of the third tube and ground, means serving to ground the control grid of the second tube, means serving to supply plate current to both said second and third tubes, said separate resistor being of such value as to provide substantially equal plate to cathode current flow for each of the second and third tubes, said second and third tubes being driven in balanced phase opposing relationship and an output circuit coupled to the plates of said second and third tubes, the output voltages appearing at the plates of the second and third tubes being 180° out of phase with respect to each other and said second and third tubes being in balance with respect to the output.

2. In an electronic apparatus for phase inversion and application, a first vacuum tube having control grid, plate and cathode elements, an input circuit coupled to the control grid of said tube, a source of plate current connected to the plate, a resistor connected between the cathode of said first tube and ground, second and third vacuum tubes each having control grid, plate and cathode elements, non-reactive means serving to couple the cathode of the second tube and the grid of tht third tube to the cathode of the first tube, said means comprising at least three resistance elements, two of said elements being in series to form the resistor which connects the cathode of the first tube to ground, the third of said elements being connected between the cathode of the second tube and the junction between said two elements, and a conductive connection from the control grid of the third tube to the cathode of the first tube, a separate resistor connected between the cathode of the third tube and ground, whereby the cathode of the third tube is grounded through a connection which is independent of said first named resistor and said coupling means, said separate resistor having a value such that the plate to cathode current flow through each of said second and third tubes is equal, means serving to ground the grid of the second tube, means serving to supply plate current to both said second and third tubes, said second and third tubes being driven in balanced phase opposing relationship, and an output circuit coupled to the plates of said second and third tubes, the output voltages appearing at the plates of the second and third tubes being 180° out of phase with respect to each other and said second and third tubes being in balance with respect to the output.

LOUIS R. BOURGET.

REFERENCES CITED

The following references are of record in the file of this patent:

UNITED STATES PATENTS

| Number | Name | Date |
|---|---|---|
| 2,208,254 | Geohegan | July 16, 1940 |
| 2,240,635 | Avins | May 6, 1941 |
| 2,252,613 | Bingley | Aug. 12, 1941 |
| 2,338,342 | Lissman | Jan. 4, 1944 |
| 2,383,351 | Smith | Aug. 21, 1945 |
| 2,383,420 | Scoles | Aug. 21, 1945 |
| 2,400,734 | Beckwith | May 21, 1946 |
| 2,419,812 | Bedford | Apr. 29, 1947 |
| 2,452,880 | Van Beuren | Nov. 2, 1948 |
| 2,563,245 | Jofeh | Aug. 7, 1951 |